(12) United States Patent
Shackleford et al.

(10) Patent No.: US 6,910,057 B2
(45) Date of Patent: Jun. 21, 2005

(54) TRUTH TABLE CANDIDATE REDUCTION FOR CELLULAR AUTOMATA BASED RANDOM NUMBER GENERATORS

(75) Inventors: J. Barry Shackleford, Portola Valley, CA (US); Motoo Tanaka, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 09/977,985

(22) Filed: Oct. 17, 2001

(65) Prior Publication Data

US 2003/0097387 A1 May 22, 2003

(51) Int. Cl.[7] ................................................. G06F 1/02
(52) U.S. Cl. .................................................... 708/250
(58) Field of Search .............................. 708/250, 252, 708/253, 256

(56) References Cited

U.S. PATENT DOCUMENTS

| | | | | |
|---|---|---|---|---|
| 4,691,291 A | * | 9/1987 | Wolfram | ..................... 708/250 |
| 4,860,236 A | * | 8/1989 | McLeod et al. | ............. 708/250 |
| 5,043,988 A | * | 8/1991 | Brglez et al. | ................ 708/252 |
| 6,272,653 B1 | * | 8/2001 | Amstutz | ...................... 714/724 |
| 6,429,795 B1 | * | 8/2002 | Amstutz | ...................... 341/102 |
| 6,708,192 B2 | * | 3/2004 | Rajski et al. | ................ 708/252 |
| 2002/0154769 A1 | * | 10/2002 | Petersen et al. | .............. 380/42 |

* cited by examiner

Primary Examiner—Tan V. Mai

(57) ABSTRACT

A system and a method to reduce a search space to determine viable cellular automata based random number generators (CA-based RNGs) are presented. A CA-based RNG is where an output of each cell of the CA at time t is dependent on inputs from any cells of the CA (including perhaps itself) at time t−1. The connections (or inputs) are selected to produce high entropy such that the RNG passes a standard suite of random number of tests, such as the DIEHARD suite. As the number of inputs grow (corresponding to the neighborhood size), the number of truth tables grows dramatically. By reducing the search space of viable CA-based RNGs, high quality random number generators with higher neighborhood sizes may be found.

16 Claims, 4 Drawing Sheets

LUT ADDRESS

| 8 | 4 | 2 | 1 | F |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 1 |
| 0 | 1 | 0 | 0 | 0 |
| 0 | 1 | 0 | 1 | 0 |
| 0 | 1 | 1 | 0 | 1 |
| 0 | 1 | 1 | 1 | 0 |
| 1 | 0 | 0 | 0 | 1 |
| 1 | 0 | 0 | 1 | 1 |
| 1 | 0 | 1 | 0 | 0 |
| 1 | 0 | 1 | 1 | 1 |
| 1 | 1 | 0 | 0 | 1 |
| 1 | 1 | 0 | 1 | 0 |
| 1 | 1 | 1 | 0 | 0 |
| 1 | 1 | 1 | 1 | 0 |

0001101101001110

$\Rightarrow 1B4E_{16}$ $\Rightarrow 6990_{10}$ $\Rightarrow CA06990$

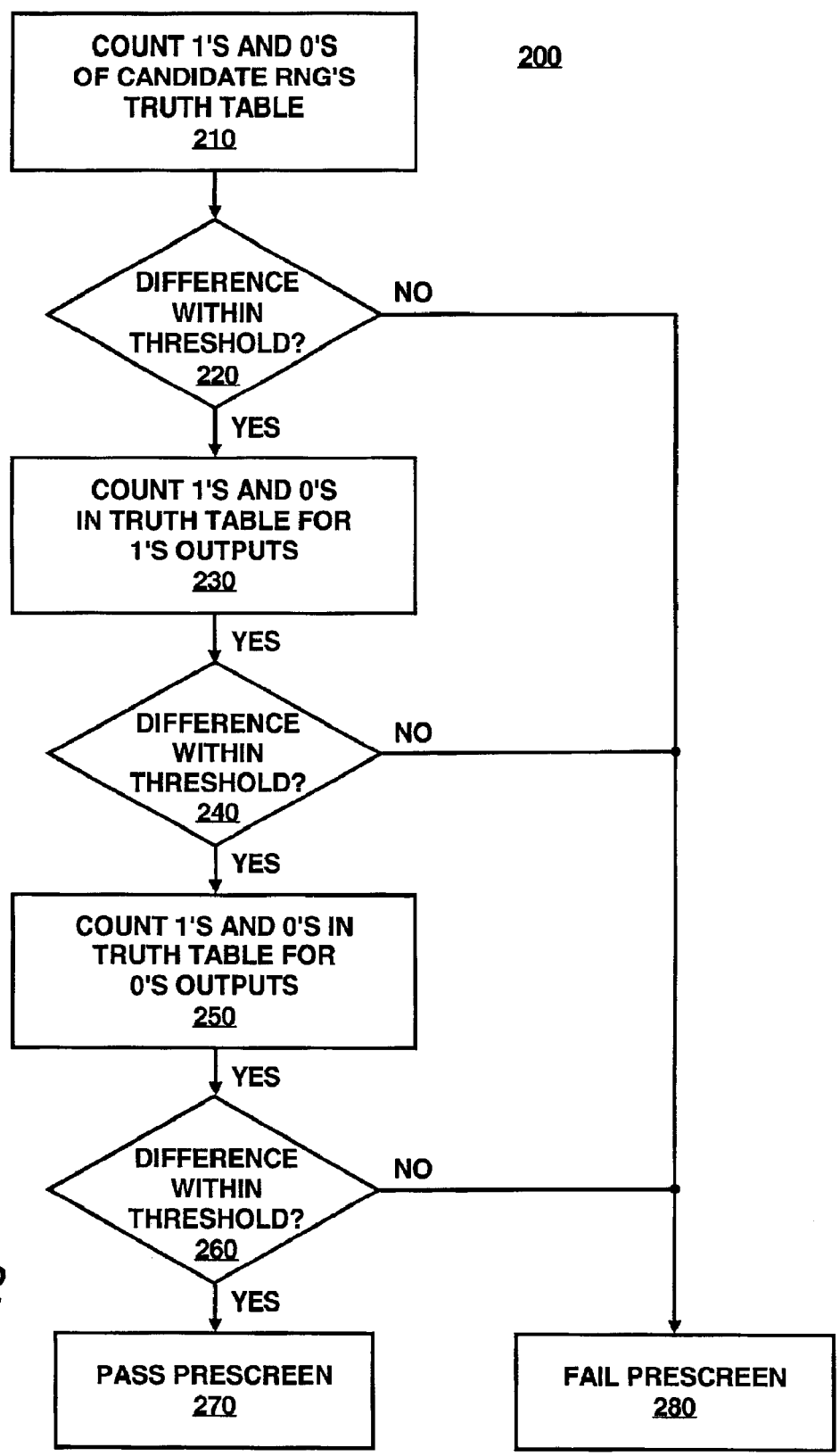

US 6,910,057 B2

TRUTH TABLE CANDIDATE REDUCTION FOR CELLULAR AUTOMATA BASED RANDOM NUMBER GENERATORS

RELATED APPLICATIONS

The following applications of the common assignee, which are hereby incorporated by reference, may contain some common disclosure and may relate to the present invention:

U.S. patent application Ser. No. 09/977,986, entitled "RANDOM NUMBER GENERATORS IMPLEMENTED WITH CELLULAR AUTOMATA"; and U.S. patent application Ser. No. 09/977,978 entitled "SOFTWARE IMPLEMENTATION OF CELLULAR AUTOMATA BASED RANDOM NUMBER GENERATORS".

FIELD OF THE INVENTION

This invention relates generally to random number generation. More specifically, this invention relates to systems and methods to generate cellular automata based random number generators (CA-based RNGs).

BACKGROUND OF THE INVENTION

Since the inception of computers, random numbers have played important roles in areas such as Monte Carlo simulations, probabilistic computing methods (simulated annealing, genetic algorithms, neural networks, and the like), computer-based gaming, and very large scale integration (VLSI) chip-testing. The bulk of the investigation into random (more properly, pseudo-random) number generation methods has been centered around arithmetic algorithms. This is because the prevalent computing medium has been the general purpose, arithmetic computer. Digital hardware designers have long relied on feedback shift registers to generate random numbers.

With the advent of VLSI design, built-in self-tests have become advantageous. In this design, the bulk of the chip testing system is incorporated on the chip itself. Linear feedback shift registers were used initially to implement the random number generation portion of the built-in self-test.

In 1986, Wolfram (S. Wolfram, "Random sequence generation by cellular automata," *Advances in Applied Mathematics*, vol. 7, pp. 123–169, June 1986) described a random sequence generation by a simple one-dimensional (1-d) cellular automata with a neighborhood size of three. The work focused on the properties of a particular CA-based RNG dubbed "CA30," so named due to the decimal value of its truth table. Statistical tests indicated that the CA30 was a superior random number generator to the ones based on linear feedback shift registers. Wolfram suggested that efficient hardware implementation of the CA30 should be possible.

Hortensius et al. (P. D. Hortensius, R. D. McLeod, and H. C. Card, "Parallel number generation for VLSI systems using cellular automata," IEEE Transactions on Computers, vol. 38, no. 10, pp. 1466–1473, October 1989) described the use of CA30 as a random number generator in an Ising computer. They also described using combinations of CAs (CA90 and CA150), which generated even better random numbers than the CA30. They further indicated that time and site spacing may improve statistical quality of random numbers generated by the CA. Time spacing is where the RNG is advanced more than one step between random number samples and site spacing is where not every bit value generated is used.

Cellular automata (CA) may be thought of as a dynamic system discrete in both time and space. CA may be implemented as an array of cells with homogeneous functionality constrained to a regular lattice of some dimension. For example, in one-dimension, the lattice could be a string (open-ended) or a ring (close-ended), or in two-dimensions, the lattice could be a plane (open-ended) or a toroid (close-ended). Open-ended CAs have boundaries that are fixed and close-ended CAs have boundaries that are periodic.

A function of a CA cell may be represented as a truth table. FIG. 1A shows an exemplary truth table for a four-input CA cell. FIG. 1B shows an exemplary implementation of a cell of the CA. As shown, the cell i implicitly includes a one-bit register. In this instance, there are 16 possible conditions to which a cell may respond (the neighborhood size N is 4 corresponding to the number of inputs). The number of unique responses is $_2 2^N$ or 65,536 (see Table 1 below). In other words, there can be 65,536 unique four-input machines for a given interconnection topology.

Referring back to FIG. 1A, a notation is provided to identify the CA implementing the above function. In essence, the output of the truth table is used as the identification in conjunction with the interconnection notation. As shown, the output of the truth table is converted to a number (from binary to base 16 to decimal). The CA represented by the truth table in FIG. 1A is denoted to be CA06990.

As indicated before, a CA may be made of multiple cells, and the inputs of one cell may connected to the output of other cells. There may even be a feedback contact meaning that one of the inputs of the cell is connected the output of the cell itself. Thus, to uniquely identify a CA, the interconnection topology information should also be provided in addition to it's truth table representation. FIG. 1C illustrates an exemplary notation, a relative displacement notation, which indicates the interconnection topology information of cell i, i.e., how far away the connecting cells are relative to a given four-input cell i.

As an example, FIG. 1D illustrates a 64-cell one-dimensional ring automata network with a displacement of $\{-1, 0, 1, 2\}$ from the perspective of cell 0. In this instance, each cell i is assumed to have the same displacement value, i.e., all cells have identical functions. In a one-dimensional ring CA network, each cell i has two adjacent neighbors, one on either side. Because the CA network is periodic, cell 63 is adjacent to the cell 0, and thus the displacement of i−1 from cell 0 lands on cell 63.

In a one-dimensional CA network, a relative displacement value $\{-1, 0, 1, 2\}$ indicates that $d_8$ input of cell i is connected to the output of the cell i−1 (one cell to the left), the $d_4$ input is connected to the output of the cell i itself, the $d_2$ input to cell i+1, and the $d_1$ input to cell i+2. More specifically, from the perspective of cell 0, the inputs $d_8$, $d_4$, $d_2$, and $d_1$ are connected to the outputs of cell 63, itself, cell 1, and cell 2, respectively.

Each cell in the CA network has a state that is updated as a function of its neighbor connections at each time step. In other words, the state of a CA at time t depends on the states of the connected neighbors at time t−1. For a binary CA cell with a neighborhood size of N, there are $_2 2^N$ possible functions. Table 1 illustrates the numbers involved. As Table 1 shows, the universe of possible functions increases extremely rapidly as the number of neighbors N grows.

TABLE 1

| Neighborhood size N | # of Possible Functions |
|---|---|
| 1 | 4 |
| 2 | 16 |
| 3 | 256 |
| 4 | 65,536 |
| 5 | 4,294,967,296 |
| 6 | $1.84 \times 10^{19}$ |
| 7 | $3.4 \times 10^{38}$ |

It is theoretically possible to exhaustively search for viable CA-based RNG. However, in reality, the exhaustive search may be conducted for a small neighborhood size due to the tremendous growth of the search space (truth tables). With modern state of the art computing, N=4 may be the practical limit for exhaustive searches.

SUMMARY OF THE INVENTION

In a first aspect of the present invention, an embodiment of a method to reduce a search space for determining viable cellular automata based random number generators (CA-based RNGs) may include counting number of 1s and 0s of outputs of a truth table for a candidate CA-based RNG and counting number of 1s and 0s of inputs of the truth table for the candidate CA-based RNG. The method may also include accepting or rejecting the candidate CA-based RNG based on results of the counting steps.

In a second aspect of the present invention, a system to reduce a search space for determining viable cellular automata based random number generator (CA-based RNGs) may include a truth-table-counting-module counting number of 1s and 0s of outputs of a truth table for a candidate CA-based RNG. The truth-table-counting module may also count number of 1s and 0s of inputs of the truth table for the candidate CA-based RNG. The system may also include a prescreening-module accepting or rejecting the candidate CA-based RNG based on an output or outputs of the truth-table-counting module.

In a third aspect of the present invention, computer readable medium may have embedded a software comprising a set of instructions for performing a method to reduce a search space for determining viable cellular automata based random number generator (CA-based RNGs). The embedded method may include counting number of 1s and 0s of outputs of a truth table for a candidate CA-based RNG and counting number of 1s and 0s of inputs of the truth table for the candidate CA-based RNG. The method may also include accepting or rejecting the candidate CA-based RNG based on results of the counting steps.

BRIEF DESCRIPTION OF THE DRAWINGS

Features of the present invention will become apparent to those skilled in the art from the following description with reference to the drawings, in which:

FIG. 2 illustrates an exemplary method to prescreen a candidate CA-based RNG.

DETAILED DESCRIPTION

For simplicity and illustrative purposes, the principles of the present invention are described by referring mainly to exemplary embodiments thereof. However, one of ordinary skill in the art would readily recognize that the same principles are equally applicable to many situations in which random numbers generators are determined.

Figures 1A, 1B:
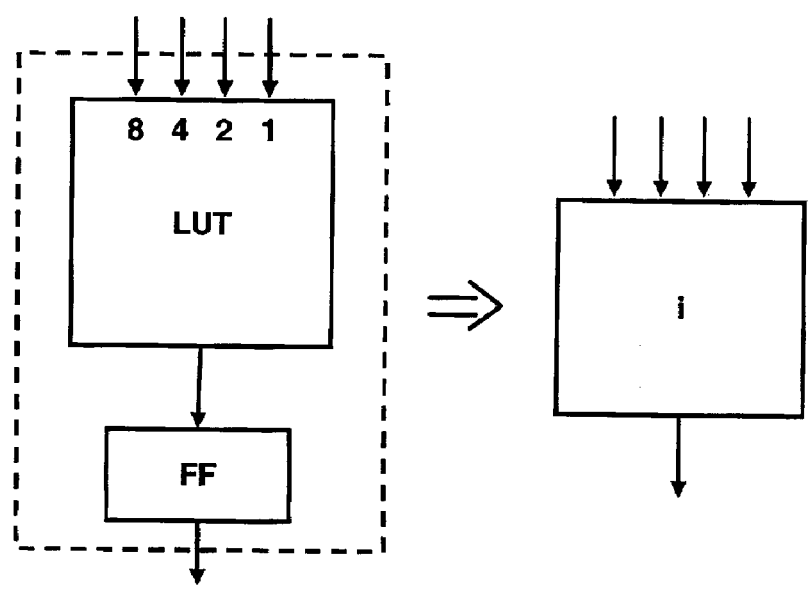
FIG. 1A illustrates an exemplary truth table for a four-input cellular automata cell and the naming notation for the cellular automata.
FIG. 1B illustrates an exemplary implementation of a cell of a cellular automata.
Figure 1C:
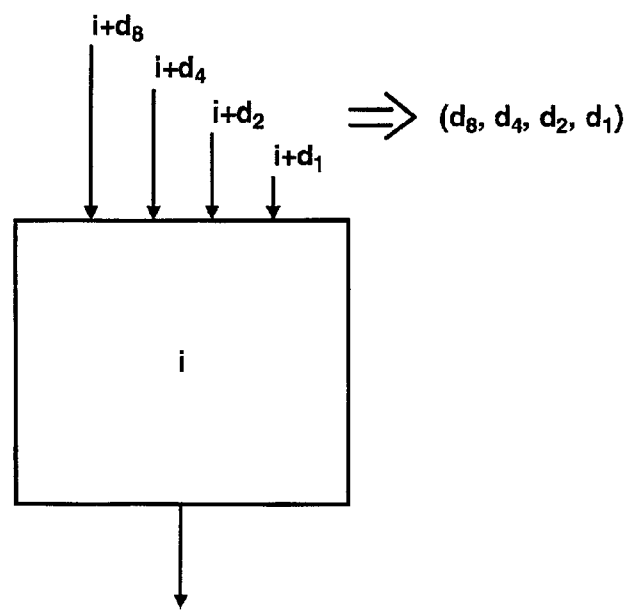
FIG. 1C illustrates an exemplary notation, a relative displacement notation, which provides a connection information of a CA cell.
Figure 1D:
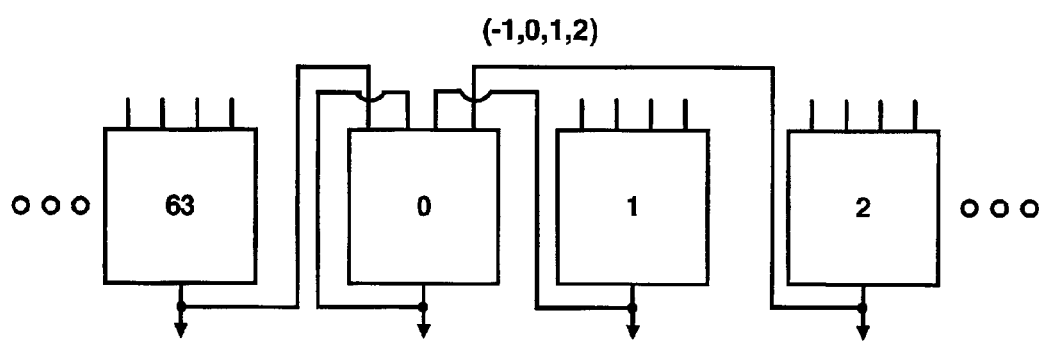
FIG. 1D illustrates an exemplary cellular automata showing the relationship between the relative displacement notation and the interconnection topology.
Figure 3:
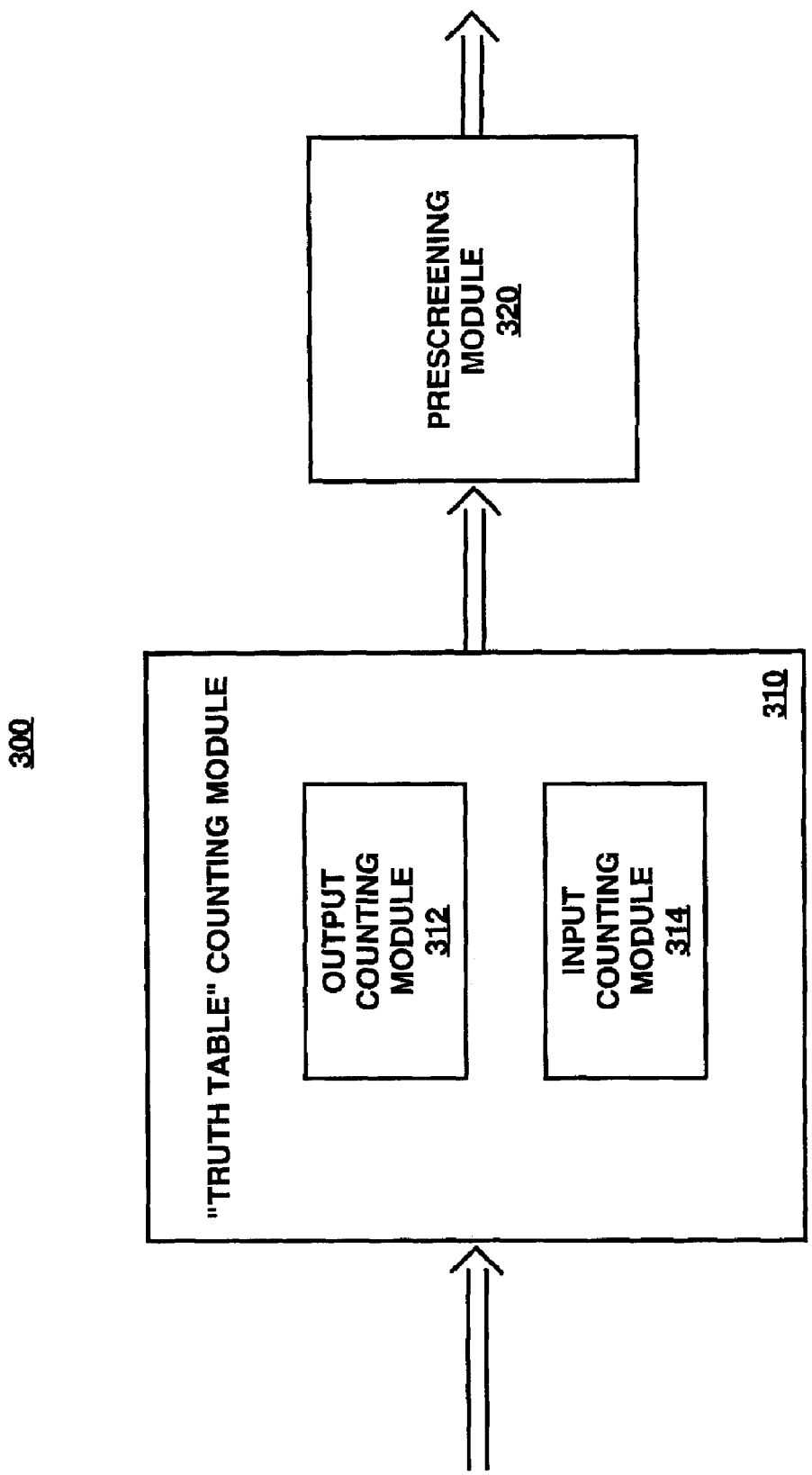
FIG. 3 illustrates a block diagram of an exemplary system to prescreen a candidate CA-based RNG.

High quality random numbers generators (RNGs) that pass stringent statistical tests may be implemented with cellular automata (CA). The basis of each cell is a logic function, which can be described by a truth table such as shown in FIG. 1A. It is also discussed above that the number of binary logic truth tables with N-inputs is $_2 2^N$. As shown in Table 1, for N=4, the number of truth tables is 65,536. When N=5, the number of truth tables for a particular topology grows to over 4 billion.

To put this into perspective, assume that viable CA-based RNGs with N=5 are being searched. The simplest instance is where the CA-based RNG has identical-function cells, i.e., the truth table is identical for all cells for the CA. In this instance, for a given topology, there are over 4 billion candidate RNGs, and each candidate RNG must be tested and evaluated. Depending of the length of the random number desired, the testing time will correspondingly increase. For example, desired length of the random may be 32 bits, 64 bits, etc. This process must be repeated for all possible topologies. As the numbers show, when searching for new random number generator implementations, reducing the search space is greatly desirable.

After performing exhaustive searches on neighborhood size of 4 CA-based RNGs, the inventors of the present invention have discovered that the CA-based RNGs that pass the battery of stringent random number tests (such as the DIEHARD suite of tests) all have common characteristics regarding their functions as represented by their truth tables.

First, the number of 1s in the output column was typically equal to the number of 0s, i.e., each count was 8. Second, the number of 1s and 0s in the input contributing to output a 0 were typically equal as well. Similarly, the number of 1s and 0s in the input contributing to output a 1 were typically equal. This is clarified by the example below.

Assume that a truth table is as follows (CA21530):

| $d_8$ | 1 | 1 | 1 | 1 | 1 | 1 | 1 | 1 | 0 | 0 | 0 | 0 | 0 | 0 | 0 | 0 |
|---|---|---|---|---|---|---|---|---|---|---|---|---|---|---|---|---|
| $d_4$ | 1 | 1 | 1 | 1 | 0 | 0 | 0 | 0 | 1 | 1 | 1 | 1 | 0 | 0 | 0 | 0 |
| $d_2$ | 1 | 1 | 0 | 0 | 1 | 1 | 0 | 0 | 1 | 1 | 0 | 0 | 1 | 1 | 0 | 0 |
| $d_1$ | 1 | 0 | 1 | 0 | 1 | 0 | 1 | 0 | 1 | 0 | 1 | 0 | 1 | 0 | 1 | 0 |
| F | 0 | 1 | 0 | 1 | 0 | 1 | 0 | 1 | 1 | 0 | 1 | 0 | 1 | 0 | 1 | 0 |

For the CA21530, there are eight 1s and eight 0s in the output. Also, for all combination of inputs ($d_8$, $d_4$, $d_2$, $d_1$) contributing to output a 0, there are sixteen 1s and sixteen 0s in the inputs. In a similar manner, it is also seen that there are sixteen 1s and sixteen 0s in the input contributing to output a 1. This indicates that the CA21530 is good candidate to pass the battery of random number tests, and thus passes the prescreening process. However, majority of the truth tables do not exhibit these characteristics and thus would not pass the prescreening process. This reduces the search space considerably.

FIG. 2 illustrates an exemplary method 200 to reduce a search space to determine viable CA-based RNGs. More specifically the method 200 prescreens a candidate CA-based RNG. In step 210, 1s and 0s of the truth table output of the candidate CA-based RNG may be counted. In step 220, if the difference in the output counts is less than or equal to a predetermined output difference threshold, then the method 200 may proceed to step 230. Otherwise, the method 200 may proceed to step 280 indicating that the particular candidate RNG has failed the prescreen process.

The predetermined output difference threshold may be zero indicating that there must be equal number of 1s and 0s. However, it is within the scope of the invention that strict adherence to equal number of 1s and 0s may not be necessary, especially as the neighborhood size N grows larger. Thus, if N is 5 or greater, then perhaps a count difference of 2 or even 4 may be tolerated. Note this predetermined output difference threshold is a parameter that may be set.

In step 230, the method 200 counts the 1s and 0s of the inputs in the truth table that generate 1s as outputs. In step 240, if the difference in the input count is less than or equal to a predetermined 1s input difference threshold, then the method 200 proceeds to step 250. Else, the method 200 proceeds to step 280. Again, the predetermined 1s difference threshold may be set to be greater than 0.

In step 250, the method 200 counts the 1s and 0s of the inputs in the truth table that generate 0s as outputs. In step 260, if the difference in the input count is less than or equal to a predetermined 0s input difference threshold, then the method 200 proceeds to step 270 indicating that the candidate RNG has passed the prescreening process. Else, the method 200 proceeds to step 280. As before, the predetermined 0s difference threshold may be set to be greater than 0.

Note that the steps of the method 200 may be modified and achieve a similar result. The steps may be modified, deleted or other steps may be added and still be within the scope of the invention.

The following example demonstrates how the screening process described above may reduce the search space. For a neighborhood size of 5 (each truth table has 32 entries), exhaustive search would require over 4 billion candidate RNGs to be evaluated for each given topology. However, if a strict equality of output counts is enforced, the number of candidate RNGs having sixteen 1s and sixteen 0s in the output is reduced to 601,080,390. In addition, if a strict equality of input counts is enforced, then the number of candidate RNGs is further reduced to 36,497,130. Thus from the original search space of 4,294,967,296, the search space is reduced by a factor of over 100—a reduction of over two orders of magnitude.

The method 200 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

FIG. 4 illustrates a block diagram of an exemplary system 400 to prescreen a candidate CA-based RNG. As shown, the system may include a truth-table-counting-module 410 counting the outputs and the inputs of the truth table of the candidate CA-based RNG. The output counting may be performed by an output-counting-module 412 and the input counting may be performed by an input-counting-module 414. The system 400 may also include a prescreening-module 420 which accepts or rejects the candidate CA-based RNG based on the results outputted by the truth-table-counting-module 410.

While the invention has been described with reference to the exemplary embodiments thereof, those skilled in the art will be able to make various modifications to the described embodiments of the invention without departing from the true spirit and scope of the invention.

The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method to reduce a search space for determining viable cellular automata based random number generators (CA-based RNGs), comprising:

counting number of 1s and 0s of outputs of a truth table for a candidate CA-based RNG;

counting number of 1s and 0s of inputs of said truth table for said candidate CA-based RNG; and accepting or rejecting said candidate CA-based RNG based on results of said counting steps.

2. The method of claim 1, wherein in said step of accepting or rejecting said candidate CA-based RNG comprises:

accepting said candidate CA-based RNG in response to all of the following conditions being met:

a difference of counts of 1s and 0s in said outputs of said truth table is less than or equal to a predetermined output difference threshold;

a difference of counts of 1s and 0s in said inputs of said truth table generating 1s for output is less than or equal to a predetermined 1s input difference threshold; and a difference of counts of 1s and 0s in said inputs of said truth table generating 0s for output is less than or equal to a predetermined 0s input difference threshold.

3. The method of claim 2, wherein at least one of said predetermined output difference threshold, predetermined 0s input difference threshold, and predetermined 1s input difference threshold is zero.

4. The method of claim 1, wherein in said step of accepting or rejecting said candidate CA-based RNG comprises:
   rejecting said candidate CA-based RNG in response to at least one of the following conditions not being met:
   a difference of counts of 1s and 0s in said outputs of said truth table is less than or equal to a predetermined output difference threshold;
   a difference of counts of 1s and 0s in said inputs of said truth table generating 1s for output is less than or equal to a predetermined 1s input difference threshold; and
   a difference of counts of 1s and 0s in said inputs of said truth table generating 0s for output is less than or equal to a predetermined 0s input difference threshold.

5. The method of claim 4, wherein at least one of said predetermined output difference threshold, predetermined 0s input difference threshold, and predetermined 1s input difference threshold is zero.

6. A system to reduce a search space for determining viable cellular automata based random number generator (CA-based RNGs), comprising:
   a truth-table-counting-module counting number of 1s and 0s of outputs of a truth table for a candidate CA-based RNG, said truth-table-counting module also counting number of 1s and 0s of inputs of said truth table for said candidate CA-based RNG; and
   a prescreening-module accepting or rejecting said candidate CA-based RNG based on an output or outputs of said truth-table-counting module.

7. The system of claim 6, wherein said truth-table-counting-module comprises:
   an output-counting-module counting number of 1s and 0s of said outputs of said truth table for said candidate CA-based RNG; and
   an input-counting-module counting number of 1s and 0s of said inputs of said truth table for said candidate CA-based RNG.

8. The system of claim 6, wherein said prescreening-module accepts said candidate CA-based RNG accepts in response to all of the following conditions being met:
   a difference of counts of 1s and 0s in said outputs of said truth table is less than or equal to a predetermined output difference threshold;
   a difference of counts of 1s and 0s in said inputs of said truth table generating 1s for output is less than or equal to a predetermined 1s input difference threshold; and
   a difference of counts of 1s and 0s in said inputs of said truth table generating 0s for output is less than or equal to a predetermined 0s input difference threshold.

9. The system of claim 8, wherein at least one of said predetermined output difference threshold, predetermined 0s input difference threshold, and predetermined 1s input difference threshold is zero.

10. The system of claim 6, wherein in said prescreening-module accepts said candidate CA-based RNG rejects in response to at least one of the following conditions not being met:
    a difference of counts of 1s and 0s in said outputs of said truth table is less than or equal to a predetermined output difference threshold;
    a difference of counts of 1s and 0s in said inputs of said truth table generating 1s for output is less than or equal to a predetermined 1s input difference threshold; and
    a difference of counts of 1s and 0s in said inputs of said truth table generating 0s for output is less than or equal to a predetermined 0s input difference threshold.

11. The system of claim 10, wherein at least one of said predetermined output difference threshold, predetermined 0s input difference threshold, and predetermined 1s input difference threshold is zero.

12. A computer readable medium on which is embedded computer software comprising a set of instructions for performing a method to reduce a search space for determining viable cellular automata based random number generator (CA-based RNGs), said method comprising:
    counting number of 1s and 0s of outputs of a truth table for a candidate CA-based RNG;
    counting number of 1s and 0s of inputs of said truth table for said candidate CA-based RNG; and
    accepting or rejecting said candidate CA-based RNG based on results of said counting steps.

13. The computer readable medium of claim 12, wherein in said method, (200) said step of accepting or rejecting said candidate CA-based RNG comprises:
    accepting said candidate CA-based RNG in response to all of the following conditions being met:
    a difference of counts of 1s and 0s in said outputs of said truth table is less than or equal to a predetermined output difference threshold;
    a difference of counts of 1s and 0s in said inputs of said truth table generating is for output is less than or equal to a predetermined is input difference threshold; and
    a difference of counts of 1s and 0s in said inputs of said truth table generating 0s for output is less than or equal to a predetermined 0s input difference threshold.

14. The computer readable medium of claim 13, wherein at least one of said predetermined output difference threshold, predetermined 0s input difference threshold, and predetermined 1s input difference threshold is zero.

15. The computer readable medium of claim 12, wherein in said method, said step of accepting or rejecting said candidate CA-based RNG comprises:
    rejecting said candidate CA-based RNG in response to at least one of the following conditions not being met:
    a difference of counts of 1s and 0s in said outputs of said truth table is less than or equal to a predetermined output difference threshold;
    a difference of counts of 1s and 0s in said inputs of said truth table generating 1s for output is less than or equal to a predetermined is input difference threshold; and
    a difference of counts of 1s and 0s in said inputs of said truth table generating 0s for output is less than or equal to a predetermined 0s input difference threshold.

16. The computer readable medium of claim 15, wherein at least one of said predetermined output difference threshold, predetermined 0s input difference threshold, and predetermined 1s input difference threshold is zero.

* * * * *

UNITED STATES PATENT AND TRADEMARK OFFICE
CERTIFICATE OF CORRECTION

| | | |
|---|---|---|
| PATENT NO. | : 6,910,057 B2 | Page 1 of 1 |
| APPLICATION NO. | : 09/977985 | |
| DATED | : June 21, 2005 | |
| INVENTOR(S) | : J. Barry Shackleford et al. | |

It is certified that error appears in the above-identified patent and that said Letters Patent is hereby corrected as shown below:

In column 7, line 27, in Claim 6, delete "(CA-based RNGs)" and insert -- CA-based RNGs --, therefor.

In column 8, line 16, in Claim 12, delete "(CA-based RNGs)" and insert -- CA-based RNGs --, therefor.

In column 8, line 25, in Claim 13, delete "(200)".

In column 8, line 33, in Claim 13, after "generating" delete "is" and insert -- 1s --, therefor.

In column 8, line 34, in Claim 13, delete "is" and insert -- 1s --, therefor.

In column 8, line 56, in Claim 15, delete "is" and insert -- 1s --, therefor.

Signed and Sealed this

Twenty-third Day of March, 2010

David J. Kappos
*Director of the United States Patent and Trademark Office*